United States Patent
Kunick

(10) Patent No.: US 8,154,712 B2
(45) Date of Patent: Apr. 10, 2012

(54) INSERTION OF LASER PATH IN MULTIPLE FIELD OF VIEW REFLECTIVE TELESCOPE

(75) Inventor: Joseph Marshall Kunick, Victor, NY (US)

(73) Assignee: Corning Incorporated, Corning, NY (US)

( * ) Notice: Subject to any disclaimer, the term of this patent is extended or adjusted under 35 U.S.C. 154(b) by 337 days.

(21) Appl. No.: 12/489,622

(22) Filed: Jun. 23, 2009

(65) Prior Publication Data

US 2010/0020307 A1    Jan. 28, 2010

Related U.S. Application Data

(60) Provisional application No. 61/082,973, filed on Jul. 23, 2008.

(51) Int. Cl.
*G01C 3/08* (2006.01)
*G02B 17/00* (2006.01)
(52) U.S. Cl. ................. 356/5.01; 359/726
(58) Field of Classification Search .......... 356/5.01; 359/726
See application file for complete search history.

(56) References Cited

U.S. PATENT DOCUMENTS

| | | | |
|---|---|---|---|
| 3,674,334 A | 7/1972 | Offner | |
| 4,205,902 A | 6/1980 | Shafer | |
| 4,221,459 A * | 9/1980 | Fisher | 359/364 |
| 4,226,501 A | 10/1980 | Shafer | |
| 4,265,510 A | 5/1981 | Cook | |
| 4,690,550 A * | 9/1987 | Kuhne | 356/5.01 |
| 4,690,551 A * | 9/1987 | Edwards et al. | 356/5.01 |
| 4,691,999 A | 9/1987 | Wheeler | |
| 4,804,258 A | 2/1989 | Kebo | |
| 5,009,494 A * | 4/1991 | Iossi et al. | 359/366 |
| 5,142,417 A | 8/1992 | Brunn | |
| 5,144,476 A | 9/1992 | Kebo | |
| 5,173,801 A | 12/1992 | Cook | |
| 5,309,276 A | 5/1994 | Rodgers | |
| 5,331,470 A | 7/1994 | Cook | |
| 5,477,395 A | 12/1995 | Cook | |
| 5,510,890 A * | 4/1996 | Langdon et al. | 356/5.01 |
| 5,627,675 A | 5/1997 | Davis et al. | |
| 5,640,008 A | 6/1997 | Bosch et al. | |
| 5,831,762 A | 11/1998 | Baker et al. | |
| 5,847,879 A | 12/1998 | Cook | |
| 5,883,706 A * | 3/1999 | Basu | 356/4.01 |
| 5,949,531 A * | 9/1999 | Ehbets et al. | 356/5.01 |
| 5,953,155 A | 9/1999 | Eckel, Jr. et al. | |

(Continued)

FOREIGN PATENT DOCUMENTS

EP    0364951 B1    2/1994

(Continued)

OTHER PUBLICATIONS

Howat: Calibration for the Gemini Telescopes, Suzanne K. Howat, John W. Harris et. al. European Southern RPT-PS-G0062, 1995.*

(Continued)

*Primary Examiner* — Thomas Tarcza
*Assistant Examiner* — Antoine J Bedard
(74) *Attorney, Agent, or Firm* — Timothy M. Schaeberle

(57) ABSTRACT

A multiple field of view reflective telescope is described herein which has a laser and associated components inserted therein. In addition, a method is described herein for using the multiple field of view reflective telescope to range an object (e.g., target) or to designate-highlight an object (e.g., target).

23 Claims, 8 Drawing Sheets

U.S. PATENT DOCUMENTS

| | | | |
|---|---|---|---|
| 6,020,994 A * | 2/2000 | Cook | 359/365 |
| 6,084,727 A | 7/2000 | Cook | |
| 6,109,756 A | 8/2000 | Takahashi | |
| 6,120,156 A | 9/2000 | Akiyama | |
| 6,268,963 B1 | 7/2001 | Akiyama | |
| 6,406,156 B1 | 6/2002 | Lin | |
| 6,441,887 B1 * | 8/2002 | Kao | 356/4.01 |
| 6,441,957 B1 | 8/2002 | Teuchert et al. | |
| 6,970,286 B1 | 11/2005 | Kunick | |
| 7,436,492 B2 * | 10/2008 | Braunecker et al. | 356/4.01 |
| 7,703,932 B2 * | 4/2010 | Cook | 359/858 |
| 2003/0133091 A1 * | 7/2003 | Kongable | 356/4.01 |
| 2006/0221324 A1 * | 10/2006 | Ing-Song et al. | 356/5.02 |

FOREIGN PATENT DOCUMENTS

| | | |
|---|---|---|
| WO | 99/13355 A1 | 3/1999 |

OTHER PUBLICATIONS

Kaulf: Crires: A High Reolution Infrared Spectrograph for ESO's VLT, Hans Ulrich Kaufl, Pascal Ballester, et al. Society of Photo-Optical, 2004. European Southern Observataor Karl-Schwarzchild-Str. 2 D-85749 Garching, Germany.*

Sasano: Light scattering characteristics of various aerosol type derived from multiple wavelength lidar observations, Yasuhiro Sasano and Edward Browell, p. 1670-1679, Applied Optics, vol. 28, No. 9, May 1, 1989.*

* cited by examiner

INSERTION OF LASER PATH IN MULTIPLE FIELD OF VIEW REFLECTIVE TELESCOPE

CLAIMING BENEFIT OF PRIOR FILED U.S. APPLICATION

This application claims the benefit of U.S. Provisional Application Ser. No. 61/082,973 entitled "Insertion of Laser Path in Multiple Field of View Reflective Telescope" filed on Jul. 23, 2008 the contents of which are hereby incorporated by reference herein.

TECHNICAL FIELD

The present invention relates in general to a multiple field of view reflective telescope which has a laser and associated components inserted therein. In one embodiment, the multiple field of view reflective telescope can be used to range an object (e.g., target) and/or to designate-highlight an object (e.g., target).

BACKGROUND

Manufacturers and designers of telescopes are constantly trying to enhance the features and functionalities of telescopes. An enhanced telescope and method for using the enhanced telescope is the subject of the present invention.

SUMMARY

In one aspect, the present invention provides a reflective telescope comprising: (a) a first entrance pupil; (b) a second entrance pupil; (c) a primary mirror that receives and reflects a first optical beam and a second optical beam that respectively passed through the first entrance pupil and the second entrance pupil; (d) a secondary mirror that receives and reflects the first and second optical beams reflected from the primary mirror; (e) a beamsplitter that passes the first and second optical beams reflected from the secondary mirror; (f) a tertiary mirror that receives and reflects the first and second optical beams that passed through the beamsplitter; (g) an exit pupil; (h) a quaternary mirror that receives the first and second optical beams reflected from the tertiary mirror and the quaternary mirror reflects the first and second optical beams to the exit pupil; (i) a laser that emits a laser beam which is received by at least one optical component and is then received by and reflected from the beamsplitter towards the second mirror which receives and reflects the laser beam towards the primary mirror which receives, reflects and collimates the laser beam; and (j) a moveable fold mirror that is capable of being moved from a non-bypass mode where the laser is used into a bypass mode where the laser is not used and where the moveable fold mirror when in the bypass mode receives a third optical beam and a fourth optical beam and the moveable fold mirror reflects the third optical beam and the fourth optical beam directly to the exit pupil instead of the third optical beam and the fourth optical beam being reflected by the primary mirror, the secondary mirror, the tertiary mirror and the quaternary mirror to the exit pupil. In other aspects of the invention, the reflective telescope can be used to range an object (e.g., target) and/or to designate-highlight an object (e.g., target) for an asset (e.g., laser-guided weaponry).

In another aspect, the present invention provides a reflective telescope comprising: (a) a first entrance pupil; (b) a second entrance pupil; (c) a primary mirror that receives and reflects a first optical beam and a second optical beam that respectively passed through the first entrance pupil and the second entrance pupil; (d) a secondary mirror that receives and reflects the first and second optical beams reflected from the primary mirror; (e) a beamsplitter that passes the first and second optical beams reflected from the secondary mirror; (f) a tertiary mirror that receives and reflects the first and second optical beams that passed through the beamsplitter; (g) an exit pupil; (h) a quaternary mirror that receives the first and second optical beams reflected from the tertiary mirror and the quaternary mirror reflects the first and second optical beams to the exit pupil; and (i) a laser that emits a laser beam which is received by at least one optical component and is then received by and reflected from the beamsplitter towards the second mirror which receives and reflects the laser beam towards the primary mirror which receives, reflects and collimates the laser beam. In other aspects of the invention, the reflective telescope can be used to range an object (e.g., target) and/or to designate-highlight an object (e.g., target) for an asset (e.g., laser-guide weaponry).

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be had by reference to the following detailed description when taken in conjunction with the accompanying drawings wherein.

DETAILED DESCRIPTION

Figure 1:
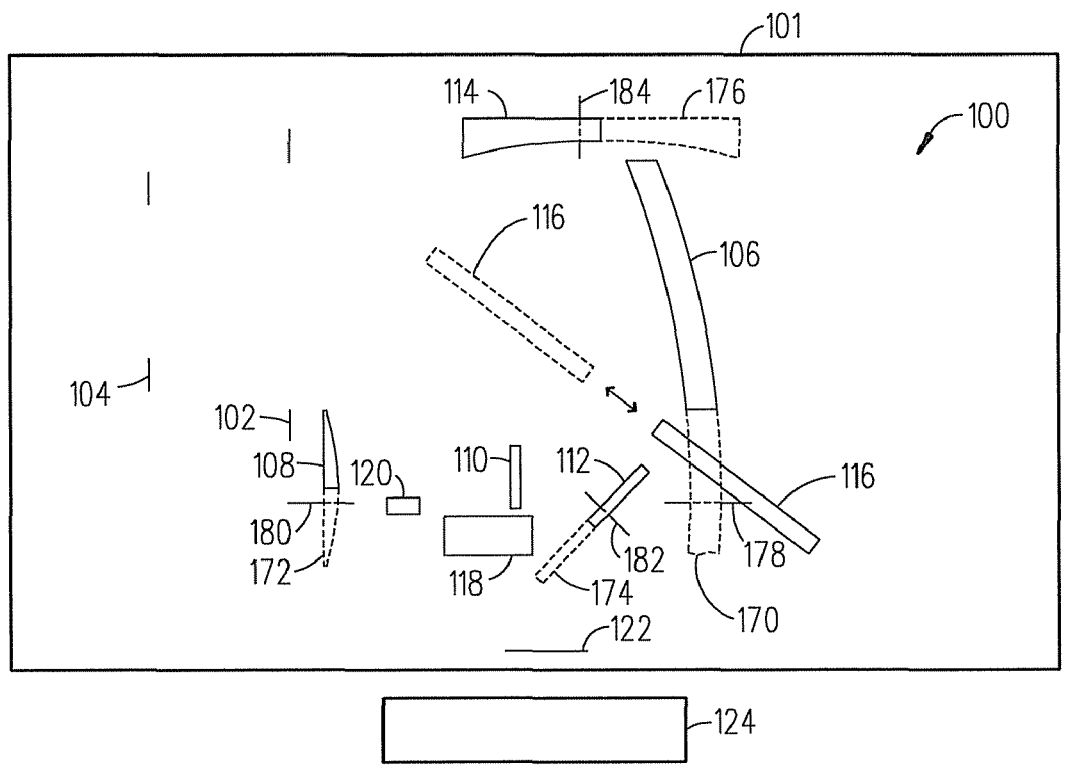
FIG. 1 is a diagram illustrating the basic components of a reflective telescope in accordance with an embodiment of the present invention.

Referring to FIGS. 1-3, there are shown several diagrams of a multiple field of view reflective telescope 100 in accordance with an embodiment of the present invention. As shown in FIG. 1, the reflective telescope 100 includes a first (large) entrance pupil 102, a second (small) entrance pupil 104, a primary mirror 106, a secondary mirror 108, a beamsplitter 110 (e.g., dichroic beamsplitter 110), a tertiary mirror 112, a quaternary mirror 114, a moveable fold mirror 116 (e.g., movable fold flat 116), a laser 118, one or more optical components 120 (which are associated with the laser 118), and an exit pupil 122. The reflective telescope 100 interfaces with one or more multiple field of view imagers 124 which are coupled to the exit pupil 122. If desired, the reflective telescope 100 can be packaged within an electro-optical gimbal assembly 101. The reflective telescope 100 is desirable since it allows multiple field of views to be accommodated to image an object (e.g., target) and also allows the laser 118 to be used to range the object (e.g., target) and/or to designate-highlight the object (e.g., target) as described in detail below with respect to FIGS. 2-5.

Figure 2A:
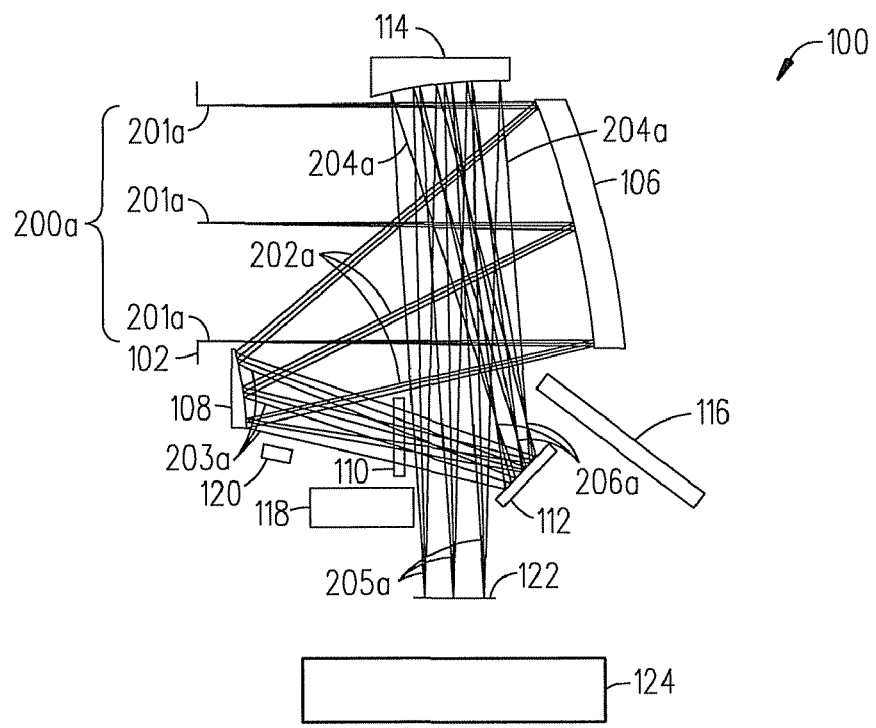
FIGS. 2A-2G are diagrams illustrating the reflective telescope when a moveable fold mirror is positioned in a non-bypass mode which enables an ultra narrow field of view (FIG. 2A) or a medium field of view (FIG. 2B) to be analyzed by multiple field of view imager(s) in accordance with an embodiment of the present invention.

Referring to FIGS. 2A-2G, there are diagrams of the reflective telescope 100 where the moveable fold mirror 116 is positioned in a non-bypass mode which accommodates an ultra narrow field of view 200*a* (FIG. 2A) or a medium field of view 200*b* (FIG. 2B) in accordance with the present invention. In FIG. 2A, the reflective telescope 100 is shown receiving incident beams 201*a* (optical beams 201*a*) from an object (not shown) that are passed through the first (large) entrance pupil 102 which is associated with the ultra narrow field of view 200*a*. The beams 201*a* are then reflected by the primary mirror 106 (e.g., primary aspheric concave mirror 106) which causes the beams 201*a* to converge to beams 202*a*. Beams 202*a* are incident on the secondary mirror 108 (e.g., secondary aspheric convex mirror 108) which reflects convergent beams 203*a*. Beams 203*a* pass through the beamsplitter 110 and are incident on the tertiary mirror 112 (e.g., tertiary aspheric mirror 112) which reflects convergent beams 204*a* to form an intermediate image 206*a*. From the intermediate image 206*a*, the beams 204*a* diverge and are incident on the quaternary mirror 114 (e.g., quaternary aspheric concave mirror 114) which substantially collimates and reflects beams 205*a* to the exit pupil 122. The exit pupil 122 is sufficiently clear of the quaternary mirror 114 so as to provide a convenient coupling for the multiple field of view imager(s) 124. The multiple field of view imager(s) 124 is set to operate in a narrow field of view mode so it can analyze beams 205*a* to image the object. In this example, the tertiary mirror 112 is disposed at a large tilt angle (for example 43°) with the incident beams 201*a*, thereby providing a beam folding configuration wherein reflected beams 204*a* and 205*a* pass in front of the primary mirror 106. This provides a beam folding function between the entering and exiting beams 201*a* and 205*a* that allows an extremely compact system configuration. FIG. 2A for clarity did not show the incident beams 201*b* associated with the medium field of view 200*b* and did not show the laser beam 201*c*', 201*c*'' and 201*c*''' emitted from the laser 118 (see FIGS. 2B-2E).

Figure 2B:
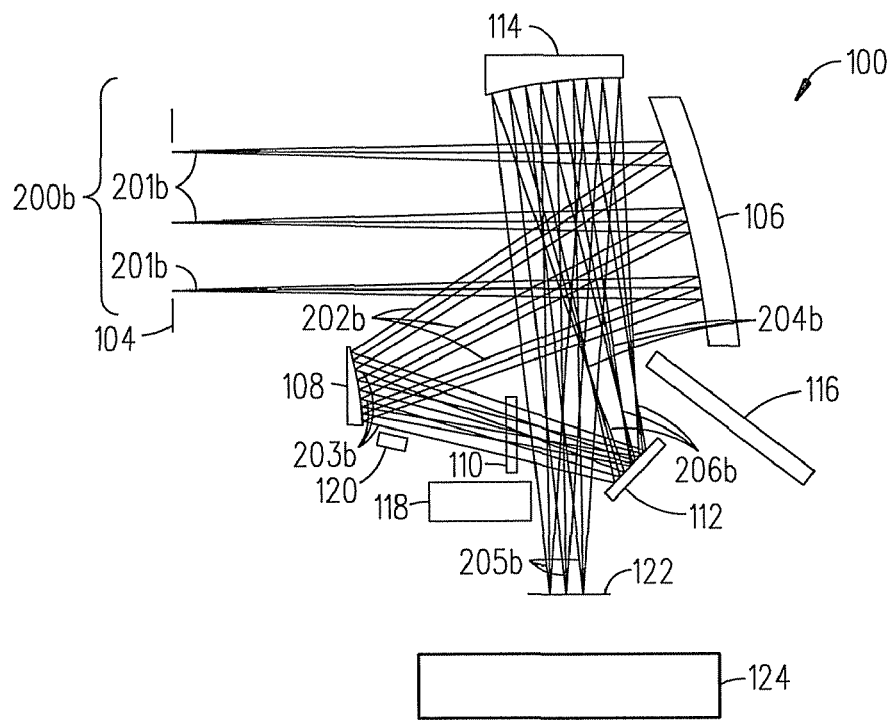

In FIG. 2B, the reflective telescope 100 is shown receiving incident beams 201*b* (optical beams 201*b*) from an object (not shown) which are passed through the second entrance pupil 104 (small aperture 104) associated with the medium field of view 200*b*. The beams 201*b* are then reflected by the primary mirror 106 (e.g., primary aspheric concave mirror 106) which causes the beams 201*b* to converge to beams 202*b*. Beams 202*b* are incident on the secondary mirror 108 (e.g., secondary aspheric convex mirror 108) which reflects beams 203*b*. Beams 203*b* pass through the beamsplitter 110 and are incident on the tertiary mirror 112 (e.g., tertiary aspheric mirror 112) which reflects convergent beams 204*b* to form an intermediate image 206*b*. From the intermediate image 206*b*, the beams 204*b* diverge and are incident on the quaternary mirror 114 (e.g., quaternary aspheric concave mirror 114) which substantially collimates and reflects beams 205*b* to the exit pupil 122. The multiple field of view imager(s) 124 coupled to the exit pupil 122 is set to operate in a wide field of view mode so it can analyze beams 205*b* to image the object. FIG. 2B for clarity did not show the incident beams 201 a associated with the ultra narrow field of view 200*a* and did not show the laser beam 201*c*', 201*c*'' and 201*c*''' emitted from the laser 118 (see FIGS. 2A and 2C-2E).

Figure 2C:
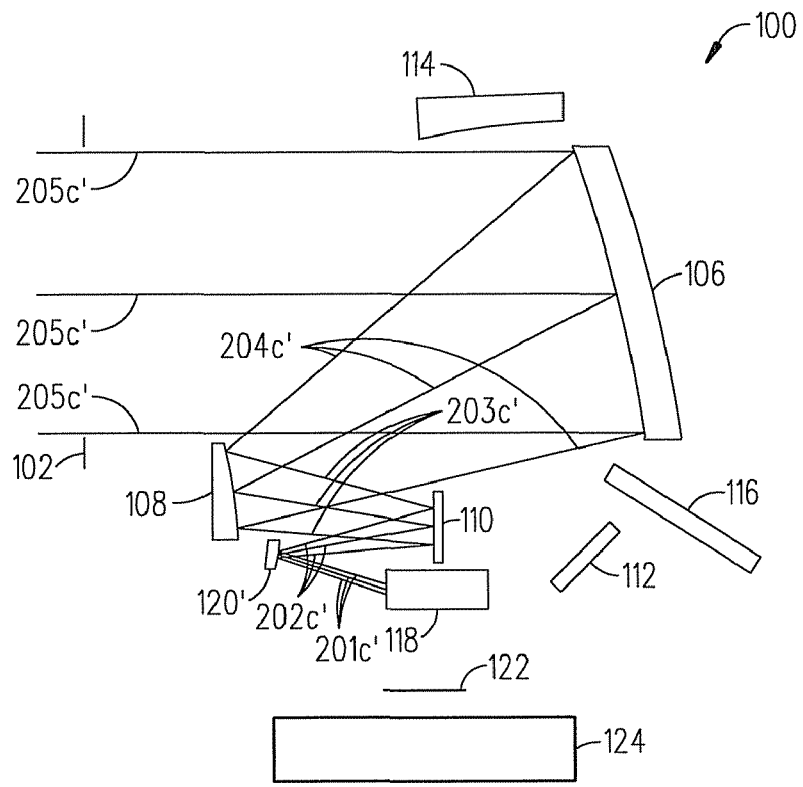

In FIG. 2C, the reflective telescope 100 is shown where the laser 118 (e.g., relatively high energy near infrared laser 118) is emitting a collimated laser beam 201*c* towards the optical component 120' which in this example is a reflective convex mirror 120'. The reflective convex mirror 120' (e.g., convex diamond-turned mirror 120') may need to be tilted and de-centered to provide clearance from the paths of imaging beams 203*a* and 203*b* (see FIG. 2F). In operation, the reflective convex mirror 120' receives a laser beam 201*c*' emitted from the laser 118 and reflects a diverging laser beam 202*c*' to the beamsplitter 110. The beamsplitter 110 receives the diverging laser beam 202*c*' and reflects a diverging laser beam 203*c*' towards the secondary mirror 108. The secondary mirror 108 receives the diverging laser beam 203*c*' and reflects a diverging laser beam 204*c*' towards the primary mirror 106. The primary mirror 106 receives the diverging laser beam 204*c*' and reflects a collimated laser beam 205*c*' towards the object (e.g., target).

In an exemplary application, a portion of the laser beam 205*c*' that is directed to the object (e.g., target) would be reflected by the object (e.g., target) and subsequently received at the first entrance pupil 102 and directed to and reflected off the primary mirror 106, the secondary mirror 108, the beamsplitter 110, and the reflective convex mirror 120' (which recollimates the reflected laser beam) before being received by a detector within the laser 118 (note: the optical elements 120'' and 120''' described below also recollimates the reflected laser beam). Thus, the laser beam reflected from the object (e.g., target) would effectively follow a reverse path to that of the laser beam 201*c*', 202*c*', 203*c*', 204*c*' and 205*c*' that was emitted from the laser 118. This particular application can be used to range the object (e.g., target) by measuring a time required for the laser beam 205*c*' to travel a roundtrip from the laser 118 to the object (e.g., target) and back to the laser 118. In another exemplary application, the laser beam 205*c*' emitted from the reflective telescope 100 can be used to designate-highlight the object (e.g., target) so an asset (e.g., laser guided weaponry) is able to recognize the highlighted object (e.g., target). Both of these applications are discussed in greater detail below with respect to FIGS. 4-5.

Figure 2D:
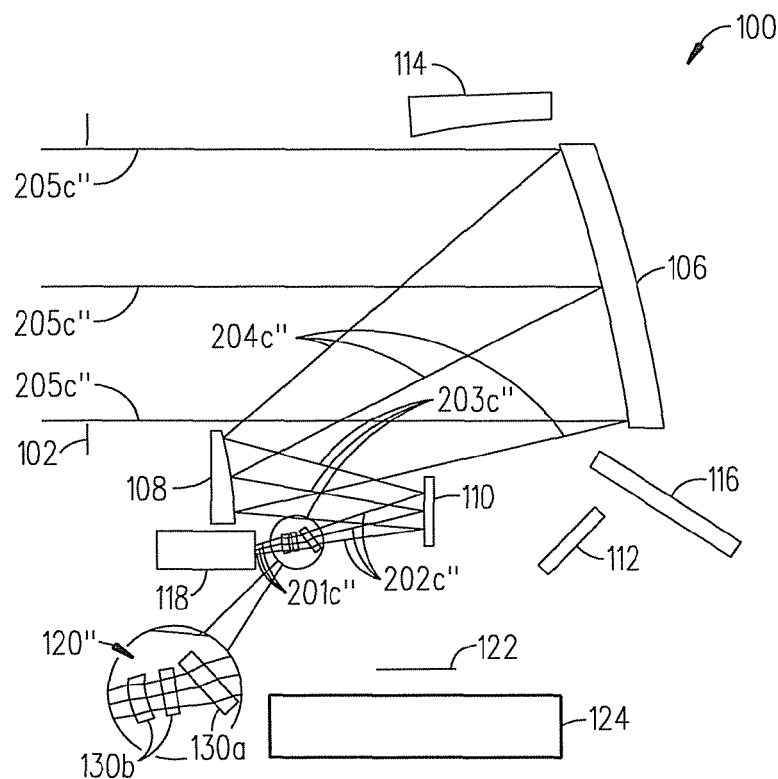

In FIG. 2D, the reflective telescope 100 is shown where the laser 118 is emitting a collimated laser beam 201*c*'' towards the optical component 120'' which in this example is a refractive recollimating optical unit 120''. As shown, the refractive recollimating optical unit 120'' includes a titled wedge plate 130*a* and a recollimating refractive achromatic doublet 130*b*. Alternatively, the titled wedge plate 130*a* can be replaced by off-axis lenses, or tilted refractive aspheres or a combination of off-axis lenses and tilted refractive aspheres. In operation, the refractive recollimating optic unit 120'' and in particular the recollimating refractive achromatic doublet 130*b* receives and directs the laser beam 201*c*'' emitted from the laser 118 to the tilted wedge plate 130*a* which directs a diverging laser beam 202*c*'' towards the beamsplitter 110. The beamsplitter 110 receives the diverging laser beam 202*c*'' and reflects a diverging laser beam 203*c*'' towards the secondary mirror 108. The secondary mirror 108 receives the diverging laser beam 203*c*'' and reflects a diverging laser beam 204*c*'' towards the primary mirror 106. The primary mirror 106 receives the diverging laser beam 204*c*'' and reflects a collimated laser beam 205*c*'' towards the object (e.g., target). The reflective telescope 100 with the refractive recollimating optical unit 120'' can be used to implement the aforementioned ranging application and/or the aforementioned designating-highlighting application.

Figure 2E:
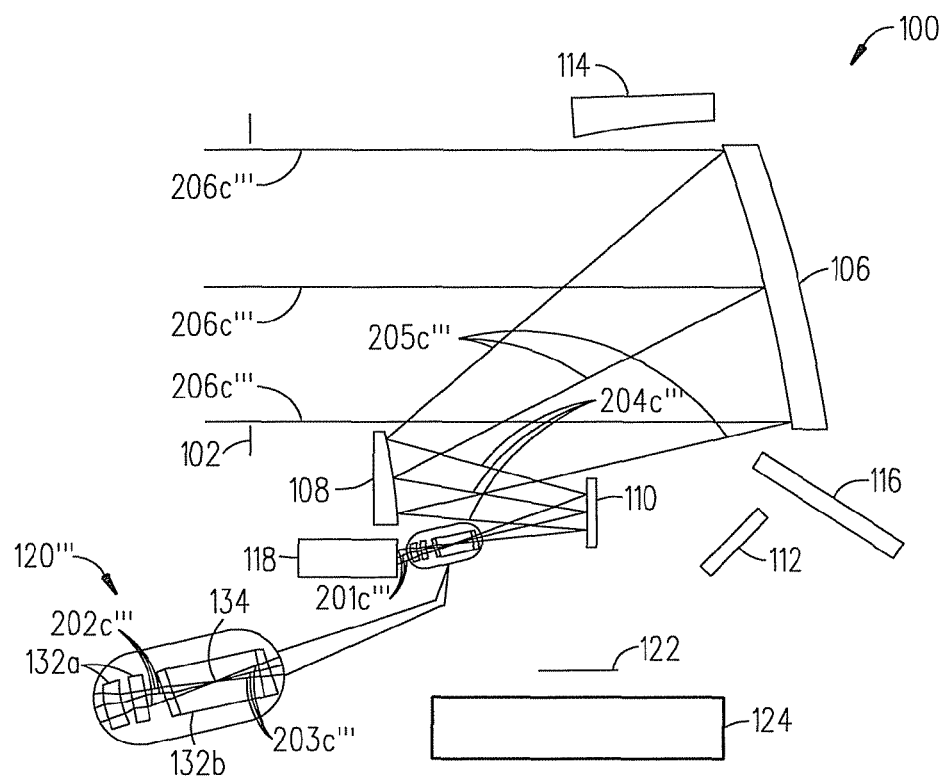

In FIG. 2E, the reflective telescope 100 is shown where the laser 118 is emitting a collimated laser beam 201*c*''' towards the optical unit 120''' which in this example includes refractive (or reflective) optics 132*a* and a gas cell 132*b*. In operation, the optical unit 120''' and in particular the refractive (or reflective) optics 132a receives the collimated laser beam 201c''' emitted from the laser 118 and outputs a focused laser beam 202c''' which forms an intermediate image 134 that is located within the gas cell 132b. The gas cell 132b contains a gas which prevents the ionization of the air which could occur if the focused laser beam 202c''' formed an intermediate image 134 in air and caused the air to breakdown into a plasma which would limit visibility and potentially damage imaging functions. The gas cell 132b directs a diverging laser beam 203c''' towards the beamsplitter 110. The beamsplitter 110 receives the diverging laser beam 203c''' and reflects a diverging laser beam 204c''' towards the secondary mirror 108. The secondary mirror 108 receives the diverging laser beam 204c''' and reflects a diverging laser beam 205c''' towards the primary mirror 106. The primary mirror 106 receives the diverging laser beam 205c''' and reflects a collimated laser beam 206c''' towards the object (e.g., target). The reflective telescope 100 with the refractive recollimating optic unit 120''' can be used to implement the aforementioned ranging application and/or the aforementioned designating-highlighting application.

Referring again to FIGS. 2A-2B, the insertion of the laser 118 into the reflective telescope 100 can be achieved by placing the beamsplitter 110 (e.g., dichroic beamsplitter 110) prior to the intermediate image 206a and 206b. The beamsplitter 110 by being inserted in the area between the secondary beams 202a and 202b and the output beams 205a and 205b dramatically reduces problematical laser fluence levels which then reduces constraints on the type of coating that can be placed on the beamsplitter 110. The beamsplitter 110 is shown to have no tilt since a tilted plate interacting with a convergent beam creates astigmatic and comatic aberrations. However, to gain clearance of the laser beam 201c', 201c'' and 201c''', the beamsplitter 110 could have a small tilt of a few degrees without significantly impacting imaging performance. The beamsplitter 110 reflects the laser beam 202c', 202c'' and 203c''' which have specific wavelengths while the beamsplitter 110 transmits other wavelength bands such as visible and infrared that are associated with the optical beams 203a and 203b. Since, the laser footprint on beamsplitter 110 is large and reflects instead of transmits the laser wavelength(s), the coating can be more easily manufacturable and encounter significantly reduced laser fluence levels.

Figure 2F:
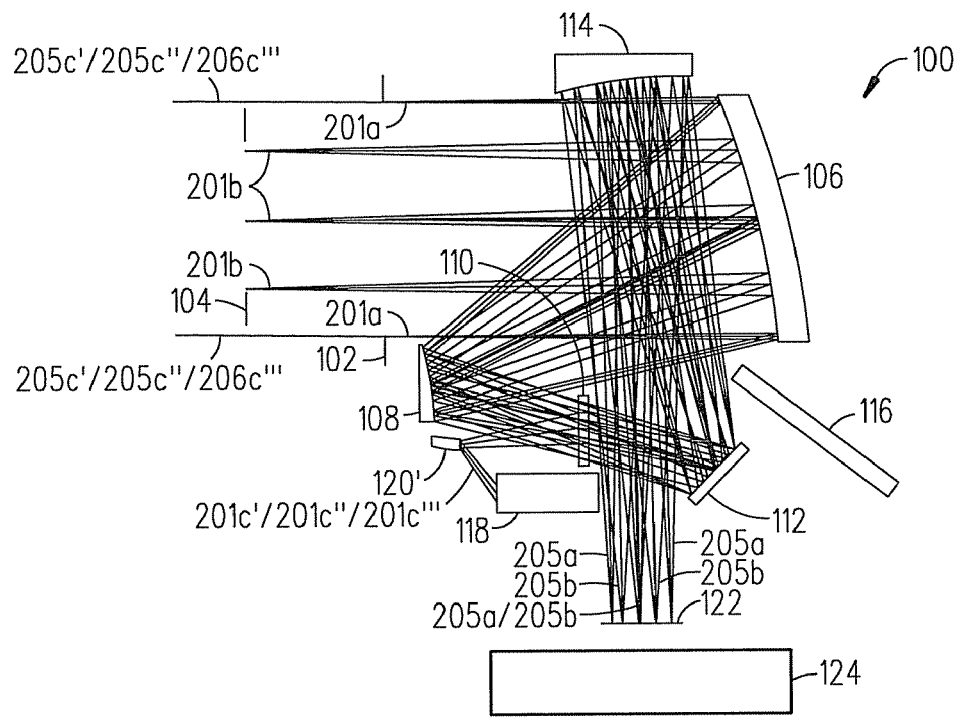
Figure 2G:
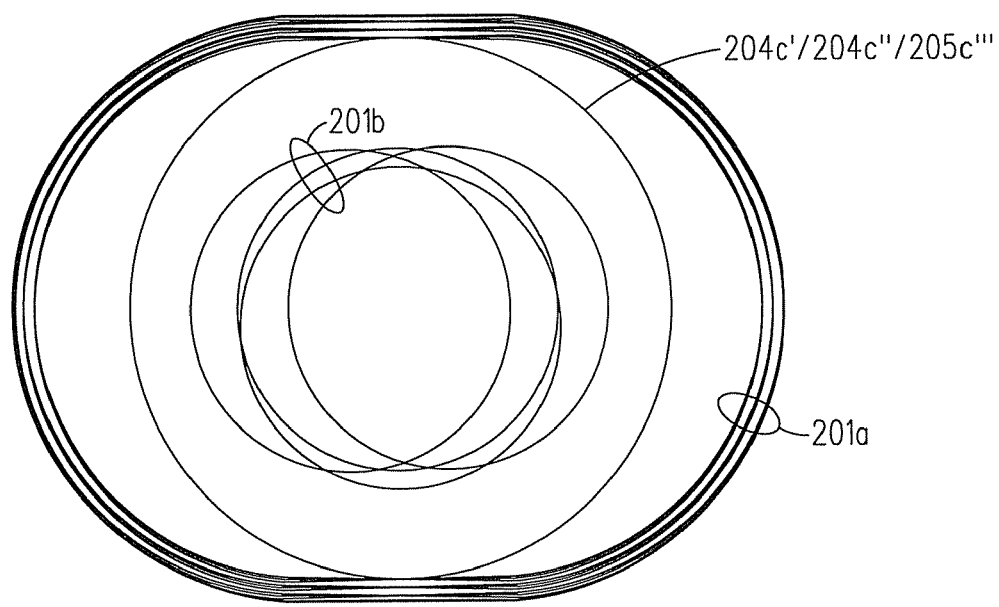

In FIG. 2F, there is a diagram of the reflective telescope 100 that illustrates the beams 201a ... 205a and 201b ... 205b respectively for both the ultra narrow field of view 200a and the medium field of view 200b along with the laser beam 201c ... 206c which are overlaid on top of one another when the moveable fold mirror 116 is positioned in the non-bypass mode. If desired, one multiple field of view imager 124 can be used and controlled to operate in either a narrow field of view mode or a wide field of view mode to separately analyze beams 205a or 205b to image an object. However, in an alternative embodiment two separate imagers 124 can be used to analyze beams 205a and 205b at the same time to form two images of the object. FIG. 2G illustrates the size that beams 201a and 201b and the laser beam 204c', 204c'' or 205c''' make on the primary mirror 106. In an embodiment, the primary mirror 106 has a racetrack "oval" shape which is the optimum shape from an aberration standpoint. Alternatively, the primary mirror 106 can have a circular or rectangular shape.

Figure 3A:
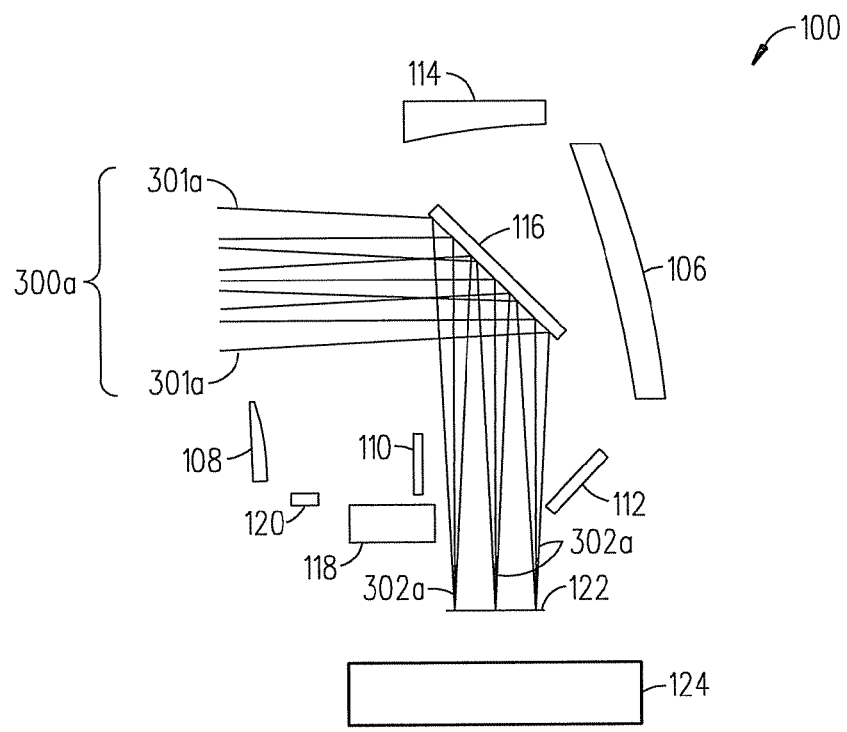
FIGS. 3A-3C are diagrams illustrating the reflective telescope when the moveable fold mirror is positioned in a bypass mode which enables a narrow field of view (FIG. 2A) or a wide field of view (FIG. 2B) to be analyzed by multiple field of view imager(s) in accordance with an embodiment of the present invention.
Figure 3B:
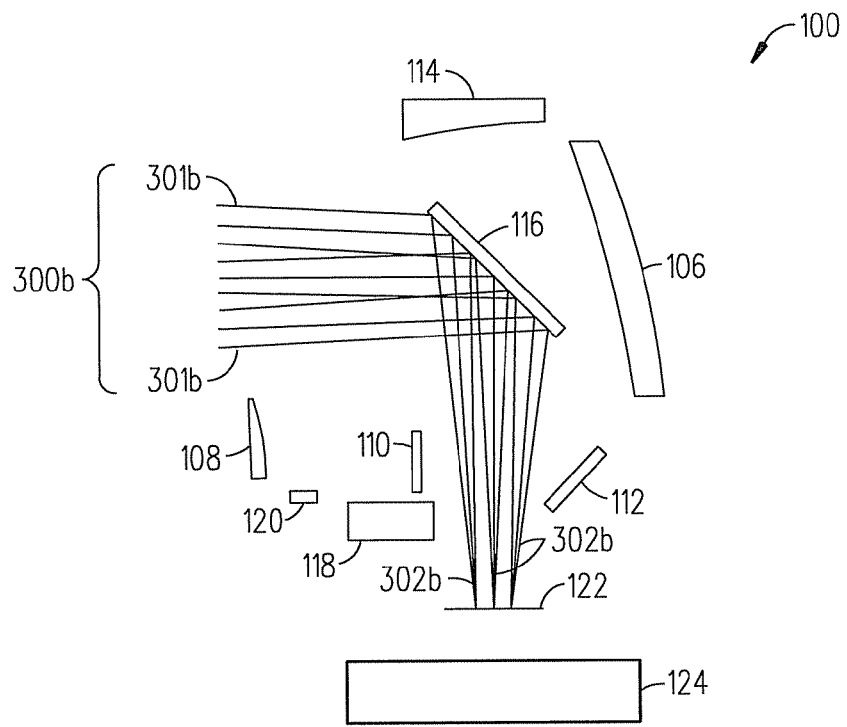
Figure 3C:
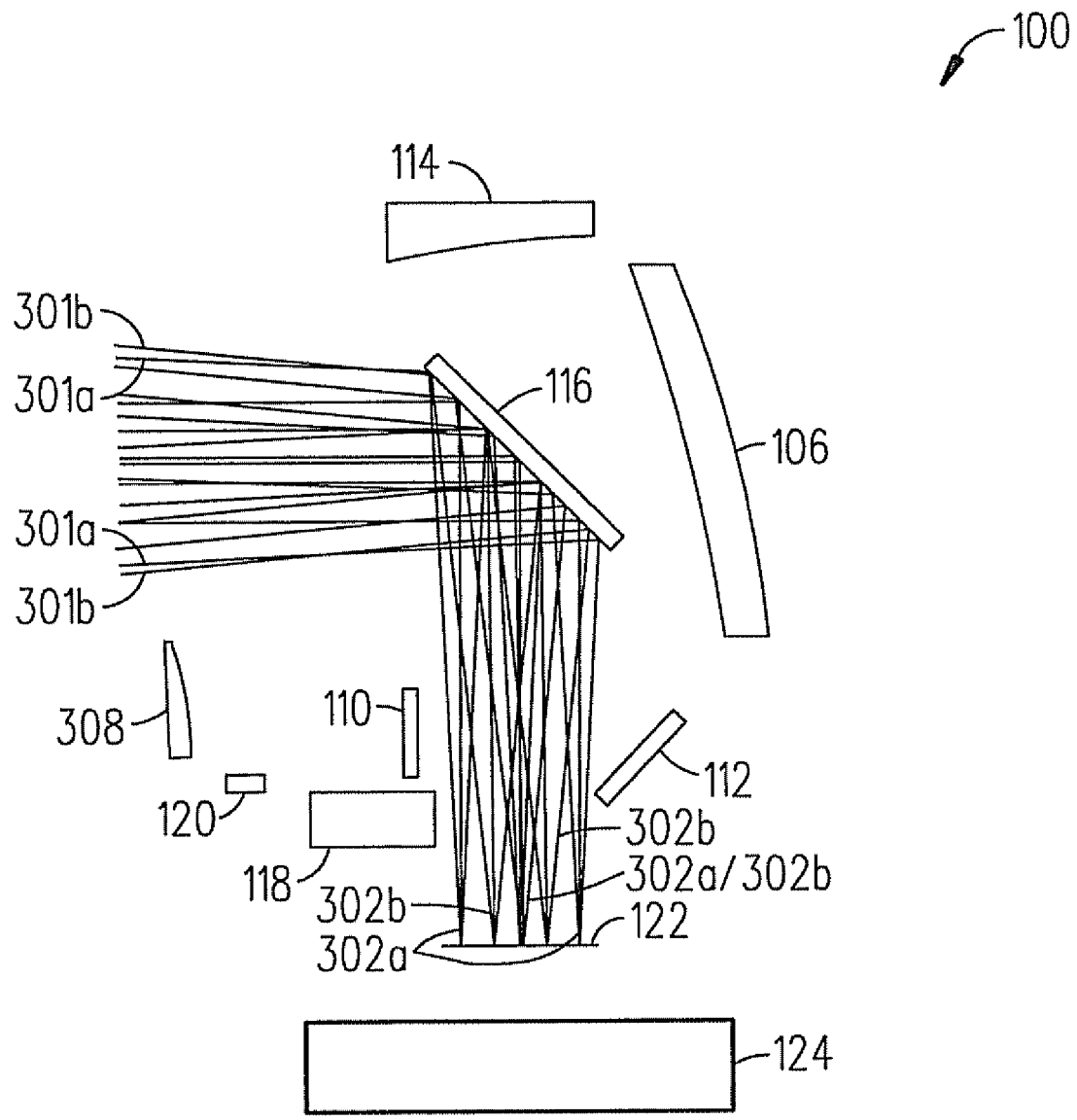

Referring to FIGS. 3A-3C, there are diagrams of the reflective telescope 100 where the moveable fold mirror 116 is positioned in a bypass mode which accommodates a narrow field of view 300a (FIG. 3A) or a wide field of view 300b (FIG. 3B) in accordance with an embodiment of the present invention. The laser 118 would not be used when the moveable fold mirror 116 is in the bypass mode since in this particular set-up the laser 118 would not be collimated by the primary mirror 106. In FIG. 3A, the reflective telescope 100 is shown receiving incident beams 301a (optical beams 301a) from an object (not shown) where the incident beams 301a are associated with the narrow field of view 300a. The beams 301a are received by the movable fold mirror 116 which directs beams 302a to the exit pupil 122. The multiple field of view imager(s) 124 coupled to the exit pupil 122 is set to operate in a narrow field of view mode so it can analyze beams 302a and image the object. In FIG. 3B, the reflective telescope 100 is shown receiving incident beams 301b (optical beams 301b) from an object (not shown) where the incident beams 301b are associated with a wide field of view 300b. The beams 301b are received by the fold mirror 116 which directs beams 302b to the exit pupil 122. The multiple field of view imager(s) 124 which is coupled to the exit pupil 122 is set to operate in a wide field of view mode so it can analyze beams 302b and image the object.

In FIG. 3C, there is a diagram of the reflective telescope 100 that illustrates the beams 301a, 302a, 301b and 302b respectively for both the narrow field of view 300a and the wide field of view 300b which are overlaid on top of one another when the movable fold mirror 116 is positioned in the bypass mode. If desired, one multiple field of view imager 124 can be used and controlled to operate in either a narrow field of view mode or a wide field of view mode to separately analyze beams 302a or 302b to image the object. However, in an alternative embodiment two separate imagers 124 can be used to analyze beams 302a and 302b at the same time to image the object. In fact, the reflective telescope 100 that has been discussed herein has four different field of views namely the ultra narrow FOV 200a and medium FOV 200b (FIGS. 2A-2B) and the narrow FOV 300a and wide FOV 300b (FIGS. 3A-3B). Thus, if desired one can obtain four "night" fields of view by using a two field of view infrared imager 124. And, to obtain four "day" fields of view one could use a two field of view visible camera 124. Both of these imagers 124 could also be implemented at the same time by placing a beamsplitter (not shown) after the exit pupil 122 to split the infrared images from the visible images before they are received by the two field of view infrared imager 124 and the two field of view visible camera 124.

Referring again to FIG. 1, there is illustrated the axes of each of the mirrors 106, 108, 112 and 114. Short dashed lines 170, 172, 174, and 176 show the imagined curvature extensions of the surfaces of mirrors 106, 108, 112 and 114 respectively. Long dashed lines 178, 180, 182, and 184 denote the axes of mirrors 106, 108, 112 and 114 respectively. In the preferred embodiment, axis 182, is not coaxial. This non-coaxiality together with an optimized optical power distribution and placement of mirrors 106, 108, 112 and 114 provides image non-obscuration and achieves optimum image quality. However, the primary mirror 106 and the secondary mirror 108 in particular may be coaxial depending upon specific design requirements, and still be within the scope of the invention. And, the quaternary mirror 114 can be coaxial with the reflected axes of mirrors 106 and 108 (reflected through the tertiary mirror 112) in alternative embodiments of this invention.

The reflective telescope 100 has a magnifying power that is determined by the ratio of the radii of curvature of the mirrors 106, 108, 112, 114 and 116 and their relative locations. Details about an exemplary 4× reflective telescope 100 is provided below with respect to TABLES 1-5 where the shapes of mirrors 106, 108, 112, 114 and 116 are concave, convex, flat, concave and flat respectively. TABLE 1 presents surface prescription data for a 4:1 image reduction embodiment of the reflective telescope 100. In TABLE 1, a "decenter" (D(j)) defines a new coordinate system (displaced and/or rotated) which is used to define surfaces of the reflective telescope 100. The surfaces which follow a decenter are aligned on the local mechanical axis (z-axis) of the new coordinate system. And, this new mechanical axis remains in use until it is changed by another decenter. The order in which displacements and tilts are applied to a given surface is specified by using different decenter types which generate different new coordinate systems.

In TABLE 1, all dimensions are given in millimeters. And, positive radii of curvature means that the center of curvature is to the right and negative radii of curvature means that the center of curvature is to the left. Moreover, the thickness indicates the axial distance to the next surface. Lastly in TABLE 1, A(i) indicates the aspheric mirror i defined by the following equation:

$$Z = \frac{(CURV)Y^2}{1+\left(1-(1+K)(CURV)^2 Y^2\right)^{\frac{1}{2}}} + (A)Y^4 + (B)Y^6 + (C)Y^8 + (D)Y^{10}$$

where the base curvature (CURV) and aspheric constants K, A, B, C, and D are given in TABLE 2.

In TABLE 3, aperture diameter is denoted by C-1 ... C-4 and aperture data in terms of diameter, decenter system and rotation are also given. In TABLE 4, decenter system data are given wherein tilt configurations are defined by angles alpha, beta, and gamma (degrees) so as to follow standard cartesian coordinate system nomenclature. The trailing code RETU means return to the coordinate system preceding the decentration and BEND means tilting the coordinate system following the reflection by an amount equal to the tilt of the surface in question. Lastly, TABLE 5 describes the changes in the diameter from the large entrance pupil 102 (small field of view) to the small entrance pupil 104 (larger field of view) in position 2 and with the insertion of laser parameters in position 3.

TABLE 1

| ELT/SUR No. | RADIUS of CURVATURE | SHAPE | THICKNESS or SEPARATION | APERTURE DIMENSION X | APERTURE DIMENSION Y | GLASS |
|---|---|---|---|---|---|---|
| OBJECT | INFINITE | FLAT | INFINITY | | | |
| 1 | | FLAT | 0.0000*19 | 203.2436 | CIR | |
| 2 (APE STOP) | | FLAT | 230.0000*1 | C-1 | | |
| 3 | DECENTER(1) | A(1) | −224.4402 | C-2 | | REFL |
| 4 | | A(2) | 106.1305 | C-3 | | REFL |
| 5-6 | INFINITE | FLAT | 5.0000*2 | C-4 | | CLEARTRAN*4 |
| | | | 72.3865*7 | C-5 | | |
| 7 | DECENTER(2)*13 | FLAT | −237.8825*12 | C-6 | | REFL*5 |
| 8 | DECENTER(3)*24 | A(3)*15 | 341.8379*16 | C-7 | | REFL |
| IMAGE | INF DECENTER(4)*18 | | | 51.3238 | | |

It should be noted that the moveable fold mirror (by-pass mirror) 116 is not included in the prescription because it slides into a fairly arbitrary location when in the by-pass mode.

TABLE 2

ASPHERIC CONSTANTS

$$Z = \frac{(CURV)Y^2}{1+(1-(1+K)(CURV)^2 Y^2)^{1/2}} + (A)Y^4 + (B)Y^6 + (C)Y^8 + (D)Y^{10}$$

| ASPHERIC | CURV | K | A | B | C | D |
|---|---|---|---|---|---|---|
| A(1) | −0.00166667 | −1.003414 | | | | |
| A(2) | −0.00423867 | −4.562087 | | | | |
| A(3) | 0.00239909*14 | −0.971414*15 | | | | |

TABLE 3

APERTURE DATA

| APERTURE | SHAPE | DIAMETER X | DIAMETER Y | DECENTER X | DECENTER Y | ROTATION |
|---|---|---|---|---|---|---|
| C-1 | RECTANGLE | 50.800 | 152.400 | | | |
| C-2 | RECTANGLE | 50.800 | 158.400 | 0.000 | 144.500 | 0.0 |
| C-3 | RECTANGLE | 60.000 | 49.000 | 0.000 | 37.240 | 0.0 |
| C-4 | RECTANGLE | 70.000 | 36.000 | 0.000 | 18.265 | 0.0 |
| C-5 | RECTANGLE | 70.000 | 36.000 | 0.000 | 18.265 | 0.0 |
| C-6 | RECTANGLE | 74.000 | 42.830 | 0.000 | 5.525 | 0.0 |
| C-7 | RECTANGLE | 150.000*21 | 75.360*22 | 0.000 | −36.870*20 | 0.0 |

TABLE 4

DECENTERING CONSTANTS

| DECENTER | X | Y | Z | ALPHA | BETA | GAMMA | |
|---|---|---|---|---|---|---|---|
| D(1) | 0.0000 | −144.5000 | 0.0000 | 0.0000 | 0.0000 | 0.0000 | |
| D(2) | 0.0000 | 0.0000 | 0.0000 | −44.0000*13 | 0.0000 | 0.0000 | (BEND) |
| D(3) | 0.0000 | 0.0000*24 | 0.0000 | 0.0000*23 | 0.0000 | 0.0000 | (RETU) |
| D(4) | 0.0000 | −36.0964*18 | 0.0000 | −0.0009*17 | 0.0000 | 0.0000 | (RETU) |

A decenter defines a new coordinate system (displaced and/or rotated) in which subsequent surfaces are defined. Surfaces following a decenter are aligned on the local mechanical axis (z-axis) of the new coordinate system. The new mechanical axis remains in use until changed by another decenter. The order in which displacements and tilts are applied on a given surface is specified using different decenter types and these generate different new coordinate systems; those used here are explained below. Alpha, beta, and gamma are in degrees.

DECENTERING CONSTANT KEY:

| TYPE | TRAILING CODE | ORDER OF APPLICATION |
|---|---|---|
| DECENTER | | DISPLACE (X, Y, Z) |
| | | TILT (ALPHA, BETA, GAMMA) |
| | | REFRACT AT SURFACE |
| | | THICKNESS TO NEXT SURFACE |
| DECENTER & RETURN | RETU | DECENTER (X, Y, Z, ALPHA, BETA, GAMMA) |
| | | REFRACT AT SURFACE |
| | | RETURN (-GAMMA, -BETA, -ALPHA, -Z, -Y, -X) |
| | | THICKNESS TO NEXT SURFACE |
| DECENTER & BEND | BEND | DECENTER (X, Y, Z, ALPHA, BETA, GAMMA) |
| | | REFLECT AT SURFACE |
| | | BEND (ALPHA, BETA, GAMMA) |
| | | THICKNESS TO NEXT SURFACE |

TABLE 5

| * ZOOM PARAMETERS | POS. 1 UNFOV | POS. 2 NFOV | POS. 3 LASER |
|---|---|---|---|
| *1 = | 230.0000 | 290.9892 | 0.0000 |
| *2 = | 5.0000 | 5.0000 | 0.0000 |
| *3 = | 0.0000 | 0.0000 | 0.0000 |
| *4 = | 'Cleartrn' | 'Cleartrn' | Refl |
| *5 = | Refl | Refl | Refr |
| *6 = | 0.0000 | 0.0000 | 0.0000 |
| *7 = | 72.3865 | 72.3865 | −85.0000 |
| *8 = | 0.0000 | 0.0000 | 0.0000 |
| *9 = | AIR | AIR | AIR |
| *10 = | 0.0000 | 0.0000 | 0.0000 |
| *11 = | 0.0000 | 0.0000 | 0.0000 |
| *12 = | −237.8825 | −237.8825 | 0.0000 |
| *13 = | −44.0000 | −44.0000 | 0.0000 |
| *14 = | 416.8243 | 416.8243 | −38.3491 |
| *15 = | −0.9714 | −0.9714 | −0.8444 |
| *17 = | −0.0009 | −0.0009 | 0.27503 |
| *18 = | −36.0964 | −36.0964 | 5.63911 |
| *19 = | 0.0000 | 0.0000 | 250.0000 |
| *20 = | −36.8700 | −36.8700 | 5.3500 |
| *21 = | 75.0000 | 75.0000 | 5.0000 |
| *22 = | 37.6800 | 37.6800 | 2.5000 |
| *23 = | 0.0000 | 0.0000 | −5.7312 |
| *24 = | 0.0000 | 0.0000 | −2.0070 |
| *16 = | 341.8379 | 341.8379 | 60.0000 |
| SEMI-FIELD ANGLE | 0.65 | 1.335 | 0.005 |
| ENTR PUPIL DIAMETER | 203.2 | 87.2 | 152.4 |
| EXIT PUPIL DIAMETER | 50.76 | 21.78 | 3.53 |

Figure 4:
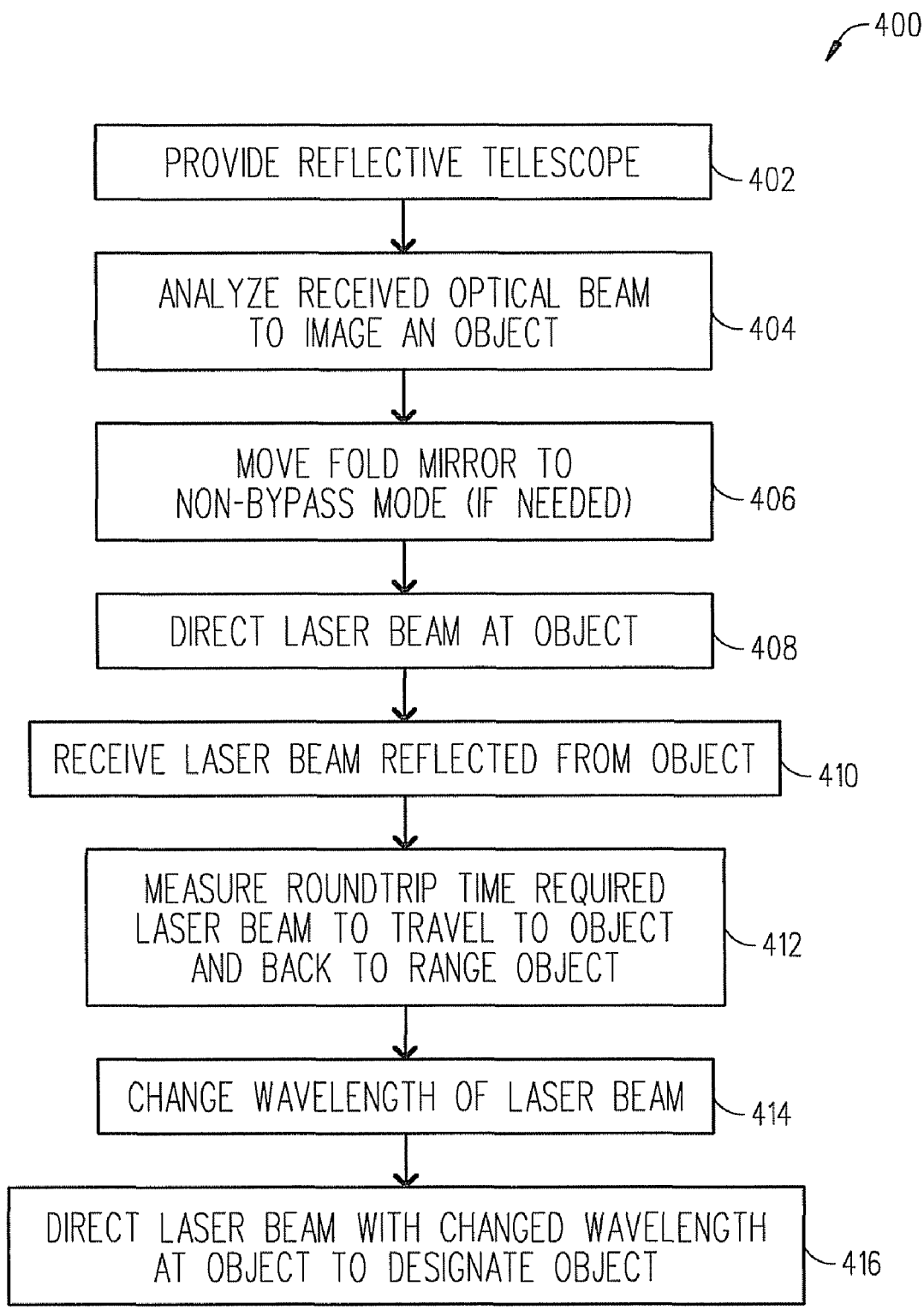
FIG. 4 is a flowchart illustrating the basic steps of a method for using the reflective telescope shown in FIG. 1 to range an object (e.g., target) in accordance with an embodiment of the present invention.

Referring to FIG. 4, there is a flowchart illustrating the basic steps of a method 400 for using the reflective telescope 100 shown in FIG. 1 to range an object (e.g., target) in accordance with an embodiment of the present invention. At step 402, the reflective telescope 100 is provided. At step 404, the reflective telescope 100 receives one of the first optical beam 201a, second optical beam 201b, third optical beam 301a or fourth optical beam 301b which is then analyzed to image the object (e.g., target). At step 406, the reflective telescope 100 is configured such that the moveable fold mirror 116 is moved if needed into the non-bypass mode (see FIGS. 2A-2F). At step 408, the reflective telescope 100 is positioned such that the laser 118 is able to direct a laser beam 205c', 205c" or 206c''' at the object (e.g., target). At step 410, the laser 118 and in particular a detector located therein receives at least a portion of a laser beam that was reflected from the object (e.g., target). At step 412, a processing unit (not shown) is used to measure a time required for the laser beam to travel a roundtrip from the laser 118 to the object (e.g., target) and back to the laser 118, where the measured time is indicative of a distance from the reflective telescope 100 to the object (e.g., target). At step 414 (optional), the laser 118 is configured to change a wavelength of the emitted laser beam 205c', 205c" or 206c'''. At step 416 (optional), the laser 118 directs the laser beam with the changed wavelength at the object (e.g., target) to designate-highlight the object (e.g., target) so that an asset (e.g., laser guided weaponry) is able to recognize the designated-highlighted object (e.g., target).

In the reflective telescope 100 shown in FIGS. 2C-2E, it can be seen that once the laser beam reflected from the object (e.g., target) is received during step 410 the reflected laser beam is able to gain clearance below the imaging channels of the optical beams 203a and 203b and is re-collimated before being received by a detector at the laser 118. In one case, the reflected laser beam could be re-collimated by the convex diamond-turned mirror 120' which also may be tilted and decentered to provide clearance from the imaging paths of optical beams 203a and 203b as shown in FIG. 2C. Or, the reflected laser beam could be re-collimated by the refractive recollimating optical unit 120" which includes a titled wedge plate 130a (used to compensate for astigmatism and coma) and a refractive achromatic doublet 130b (used for collimation at two near infrared wavelengths) shown in FIG. 2D.

Alternatively, the reflected laser beam could be re-collimated by using the optical unit 120''' which includes the refractive (or reflective) optics 132a and the gas cell 132b shown in FIG. 2E which effectively create a re-imaging telescope for the laser path.

Figure 5:
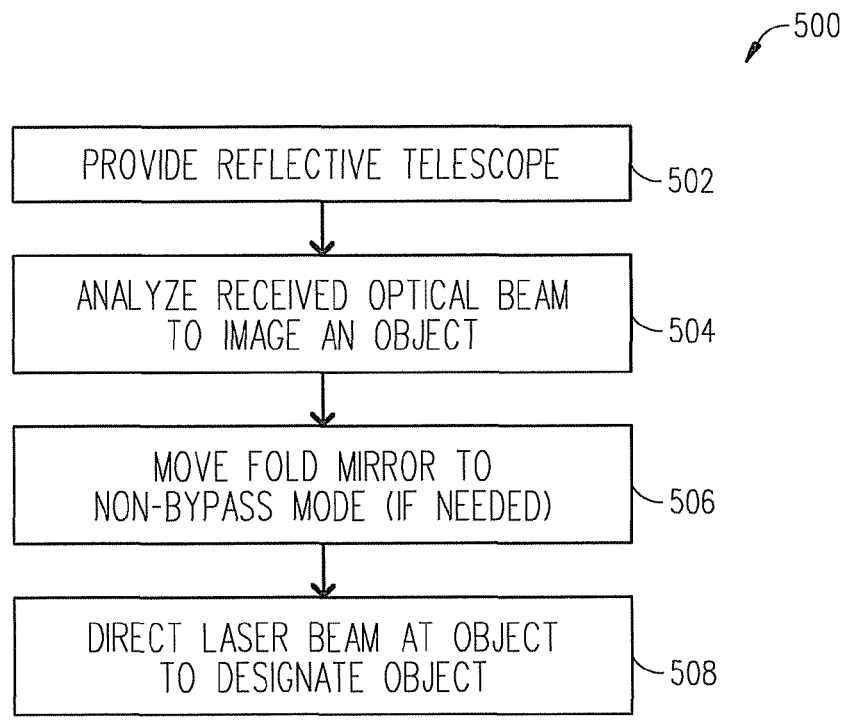
FIG. 5 is a flowchart illustrating the basic steps of another method for using the reflective telescope shown in FIG. 1 to designate-highlight an object (e.g., target) in accordance with an embodiment of the present invention.

Referring to FIG. 5, there is a flowchart illustrating the basic steps of a method 500 for using the reflective telescope 100 shown in FIG. 1 to designate-highlight an object (e.g., target) in accordance with an embodiment of the present invention. At step 502, the reflective telescope 100 is provided. At step 504, the reflective telescope 100 receives one of the first optical beam 201a, second optical beam 201b, third optical beam 301a or fourth optical beam 301b which is then analyzed to image the object (e.g., target). At step 506, the reflective telescope 100 is configured such that the moveable fold mirror 116 is moved if needed into the non-bypass mode (see FIGS. 2A-2F). At step 508, the reflective telescope 100 is positioned such that the laser 118 is able to direct a laser beam 205c', 205c'' or 206c''' at the object (e.g., target) to designate-highlight the object (e.g., target) so an asset (e.g., laser guided weaponry) is able to recognize the designated-highlighted object.

The aforementioned functionalities of the laser range method 400 and the laser designator method 500 are made possible with the addition of the laser 118 to the reflective telescope 100. These functionalities are described in more detail as follows:

Laser range method 400 is desirable since the reflective telescope 100 can be operated in either night (infrared) or daytime (visible) so the operator can find a target or other object that is of interest. The operator can then fire the laser 118 at this object. The laser beam travels out of the reflective telescope 100, reflects or scatters from target and a small fraction of the energy is then returned to the reflective telescope 100 and imaged onto a detector in the laser unit 118. Measuring the time required for the laser beam to travel the roundtrip from laser-to-target-to-laser, enables the range (or distance) to the target to be easily calculated. The knowledge of the range to the target allows the operator to characterize the threat of target, determine engagement scenarios, and set targeting parameters for laser-guided weapon systems.

The laser designator method 500 is desirable since the reflective telescope 100 can be operated in either night (infrared) or daytime (visible) so an operator can find a target or other object that is of interest. The operator can then fire the laser 118 at this object to identify the object for other assets (e.g., laser-guided weapon systems) in the field. If desired, the operator can highlight, or indicate, the selected target, by flashing the laser beam on the target. The assets (e.g., localized assets) which respond to the designation wavelength of the laser beam can then image the light reflected or scattered from the target and recognize the same target. One specific example of an asset is laser guided weaponry. For instance, if a target is selected for neutralization, then the operator can highlight the target by firing the laser beam on the target. The laser-guided weapon's imaging system responds to the wavelength that is associated with the reflected or scattered light from the target. The laser-guided weapon system can then use centroid algorithms to place the target in the center of the field of view of its sensor so a weapon can be guided directly to the target. The laser-guided weapon(s) can be co-located with the operator or remotely released by other assets.

The laser range method 400 can include the laser designation method 500 where both methods would typically be performed with the laser 118 set at slightly different wavelengths for eye safety concerns. For instance, the laser range method 400 would be performed at eye safe wavelengths to protect the operator and other friendly assets in the field. In contrast, the laser designation method 500 often requires significantly more energy for the laser-guided weapon system to operate successfully and does not typically use eye safe wavelengths. Therefore, the reflective telescope 100 which can be achromatized or able to operate at multiple wavelengths has a significant advantage. Plus, the reflective telescope 100 with all-reflective optical elements would introduce no chromatic aberrations. If the reflective telescope 100 for packaging considerations uses a refractive solution like the optical components 120'' shown in FIG. 2D, then a minimum of two powered lenses may be needed to correct chromatic aberrations that are introduced.

The insertion of the beamsplitter 110 (e.g., dichroic beamsplitter 110) in the reflective telescope 100 allows the full aperture laser receiver/designator to be used simultaneously with night and day imaging systems 124. In one embodiment, the beamsplitter 110 is coated with a material that reflects the laser wavelength(s) (typically near infrared 1-2 microns) and transmits the imaging wavelengths of optical beams 203a and 203b (see FIGS. 2A-2B). If both a day visible CCD camera 124 and a night mid-wave and long-wave infrared thermal imagers 124 are used then a material like water clear zinc sulfide (Cleartran) or calcium fluoride could be used for the beamsplitter's substrate and an exemplary multilayer notch coating can be applied to coat the beamsplitter 110. The beamsplitter 110 should also be placed as close to the secondary mirror 108 as possible while allowing beam clearance for the optical beams 202a and 202b leaving the primary mirror 106 and impinging on the secondary mirror 108 (see FIGS. 2A-2B). The beamsplitter 110 may need to be tilted slightly in plane of telescope aperture offset to allow the laser beam 202c', 202c'' and 203c''' to reflect below the imaging optical beam 203a and 203b leaving the secondary mirror 108. Once the clearance is achieved the laser light can be recollimated using anyone of the aforementioned optical units 120', 120'' and 120''' (see FIGS. 2C-2E).

Figure 6:
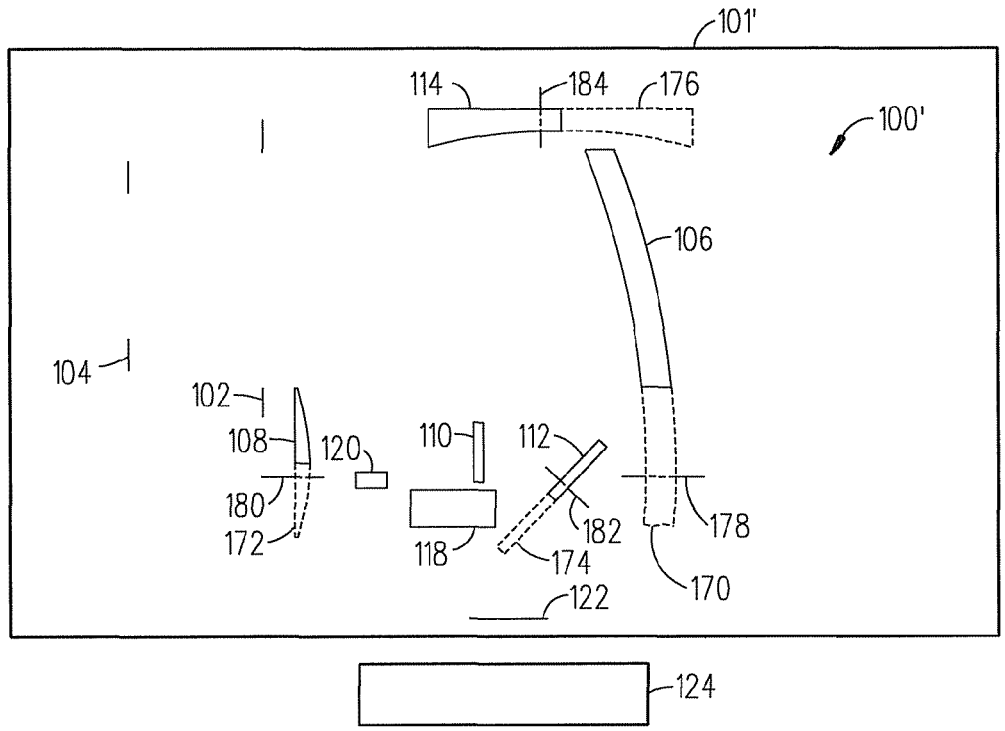
FIG. 6 is a diagram of a reflective telescope which does not contain the moveable fold mirror in accordance with another embodiment of the present invention.

Referring to FIG. 6, there is a diagram of a reflective telescope 100' in accordance with another embodiment of the present invention. The reflective telescope 100' is similar to the reflective telescope 100 shown in FIG. 1 except that is does not have the moveable fold mirror 116. As shown, the reflective telescope 100' includes a first (large) entrance pupil 102, a second (small) entrance pupil 104, a primary mirror 106, a secondary mirror 108, a beamsplitter 110 (e.g., dichroic beamsplitter 110), a tertiary mirror 112, a quaternary mirror 114, a laser 118, one or more optical components 120 (which are associated with the laser 118), and an exit pupil 122. If desired, the reflective telescope 100' can be packaged within an electro-optical gimbal assembly 101'. The reflective telescope 100' interfaces with one or more multiple field of view imager(s) 124 which are coupled to the exit pupil 122. The reflective telescope 100' can be used to range an object (e.g., target) and/or to designate-highlight an object (e.g., target).

From the foregoing, it can be readily appreciated by those skilled in the art that the reflective telescopes 100 and 100' are desirable in that they enable different applications to be performed such as the ranging of an object (e.g., target) or the designating-highlighting of an object (e.g., target). Although, several different embodiments of the present invention have been described above, it should be understood, however, that the present invention is not limited to these embodiments, since modifications may be made by those skilled in the art, particularly in light of the foregoing teachings. To illustrate this, several additional alternatives are discussed below to further illustrate some of the different possible ways one can insert a laser path in a multiple field of view reflective telescope. First, one can eliminate the use of the beamsplitter and allow the laser to transmit through the entire reflective telescope but this would cause air breakdown and plasma creation at the intermediate image. The insertion of a gas cell near the intermediate image to vacate air and prevent plasma creation by the laser beam would not address this problem due to the resulting obscuration, aberrations and loss of transmission in imaging channels. Second, one can eliminate the use of the beamsplitter and instead create a central hole on the fold mirror to pass the laser channel but this would create a large obscuration in center of field of view of the imaging channels. In addition, the laser would have to be co-boresighted with imaging channels so use of an angular offset for the laser would not be possible.

Following are some additional features, advantages and uses of the reflective telescopes 100 and 100' in accordance with embodiments of the present invention:

The all-reflective (or catoptric) reflective telescopes 100 and 100' avoid chromatic aberration because there is no dispersion from a reflective surface as there is through a lens. As such, the reflective telescopes 100 and 100' allow a broad spectrum of electromagnetic radiation, from infrared to ultraviolet, to be magnified identically within the limits of geometric optics.

The entrance pupils 102 and 104 may be disposed anywhere along incident beams 201a, 201b, 301a and 301b and one or both may be disposed at the primary mirror 106 to ensure that the exit pupils 122 are coplanar.

The afocal, all-reflective (catoptric) reflective telescopes 100 and 100' provide significant magnifying power while minimizing aberration and providing full spectrum coverage at high wavefront quality.

The reflective telescopes 100 and 100' can have aspheric mirrors 106, 108, 112, and 114. And, the by-pass mirror 116 if used is flat.

The reflective telescopes 100 and 100' have a ball-like configuration which is advantageously suitable to be packaged in an electro-optical gimbal assembly 101 and 101' (see FIGS. 1 and 6). In such an assembly, the reflective telescopes 100 and 100' would be well suited for use in airborne and outer space applications.

The multiple field of view imager 124 can analyze two, three or more field of views. For example, a commercially available multiple field of view imager 124 that can with some minor modifications be used in the present invention is sold under the brand name SC5500 by Oregon Camera Systems.

The reflective telescope 100 also has the following advantages:
  Minimizes refractive components in imaging paths.
  Laser light reflects rather than transmits through the beamsplitter coating.
  Laser footprint is large on the beamsplitter 110 which reduces the laser fluence and damage threshold.
  Allows use of either refractive or reflective recollimating lenses for the laser path.
  Non-reimaging options do not create an image of laser beam so they do not require a gas cell to be placed in the laser path (see FIGS. 2C-2D).
  Re-imaging option creates a small intermediate image but only a very small gas cell is needed which only passes laser wavelengths, not imaging beams (see FIG. 2E).
  Reflective recollimating lens does not introduce chromatic aberrations so any laser wavelength can be used with the same design or multiple lasers can be used.

Although multiple embodiments of the present invention have been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

The invention claimed is:

1. A reflective telescope comprising:
  a first entrance pupil;
  a second entrance pupil;
  a primary mirror positioned to directly receive and reflect a first optical beam and a second optical beam that respectively passed through said first entrance pupil and said second entrance pupil;
  a secondary mirror positioned to directly receive and reflect the first and second optical beams reflected from said primary mirror;
  a beamsplitter positioned to directly receive and pass the first and second optical beams reflected from said secondary mirror;
  a tertiary mirror positioned to directly receive and reflect the first and second optical beams that passed through said beamsplitter;
  an exit pupil;
  a quaternary mirror positioned to directly receive the first and second optical beams reflected from said tertiary mirror and said quaternary mirror positioned to reflect the first and second optical beams to said exit pupil;
  a laser positioned to emit a laser beam which is received by at least one optical component and is then received by and reflected from said beamsplitter towards said secondary mirror positioned to directly receive and reflect the laser beam towards said primary mirror positioned to directly receive, reflect and collimate the laser beam; and
  a moveable fold mirror that is capable of being moved from a non-bypass mode where said laser is used into a bypass mode where said laser is not used and where said moveable fold mirror when in the bypass mode is positioned to directly receive a third optical beam and a fourth optical beam and said moveable fold mirror positioned to reflect the third optical beam and the fourth optical beam directly to said exit pupil instead of the third optical beam and the fourth optical beam being reflected by said primary mirror, said secondary mirror, said tertiary mirror and said quaternary mirror to said exit pupil.

2. The reflective telescope of claim 1, further comprising a multiple field of view imager for analyzing either the first optical beam or the second optical beam at said exit pupil when said moveable fold mirror is positioned in the non-bypass mode wherein the third optical beam and the fourth optical beam are not reflected to said exit pupil.

3. The reflective telescope of claim 1, further comprising a multiple field of view imager for analyzing either the third optical beam or the fourth optical beam at said exit pupil when said moveable fold mirror is positioned in the bypass mode wherein the first optical beam and the second optical beam are not reflected to said exit pupil.

4. The reflective telescope of claim 1, wherein said at least one optical component comprises a reflective convex mirror.

5. The reflective telescope of claim 1, wherein said at least one optical component comprises a refractive recollimating optic unit including a titled wedge plate and a recollimating refractive achromatic doublet.

6. The reflective telescope of claim 1, wherein said at least one optical component comprises a gas cell and recollimating optics.

7. The reflective telescope of claim 1, wherein said tertiary mirror is a flat tertiary mirror.

8. The reflective telescope of claim 1, wherein:
said first entrance pupil has a relatively large aperture and a relatively ultra narrow field of view; and
said second entrance pupil has a relatively small aperture and a relatively medium field of view.

9. The reflective telescope of claim 1, wherein said primary mirror has a substantially oval shape.

10. The reflective telescope of claim 1, wherein said primary mirror, said secondary mirror, said beamsplitter, said tertiary mirror, said quaternary mirror, said moveable fold mirror, said laser and said at least one optical component are all packaged in an electro-optical gimbal assembly.

11. A method for using a reflective telescope, said method comprising the steps of:
providing said reflective telescope which comprises:
a first entrance pupil;
a second entrance pupil;
a primary mirror positioned to directly receive and reflect a first optical beam and a second optical beam that respectively passed through said first entrance pupil and said second entrance pupil;
a secondary mirror positioned to directly receive and reflect the first and second optical beams reflected from said primary mirror;
a beamsplitter positioned to directly receive and pass the first and second optical beams reflected from said secondary mirror;
a tertiary mirror positioned to directly receive and reflect the first and second optical beams that passed through said beamsplitter;
an exit pupil;
a quaternary mirror positioned to directly receive the first and second optical beams reflected from said tertiary mirror and said quaternary mirror positioned to reflect the first and second optical beams to said exit pupil;
a laser positioned to emit a laser beam which is received by at least one optical component and is then received by and reflected from said beamsplitter towards said second mirror positioned to directly receive and reflect the laser beam towards said primary mirror positioned to directly receive, reflect and collimate the laser beam; and
a moveable fold mirror that is capable of being moved from a non-bypass mode where said laser is used into a bypass mode where said laser is not used and where said moveable fold mirror when in the bypass mode is positioned to directly receive a third optical beam and a fourth optical beam and said moveable fold mirror positioned to reflect the third optical beam and the fourth optical beam directly to said exit pupil instead of the third optical beam and the fourth optical beam being reflected by said primary mirror, said secondary mirror, said tertiary mirror and said quaternary mirror to said exit pupilanalyzing at least one of the first optical beam, the second optical beam, the third optical beam or the fourth optical beam to find an object;
moving, if needed, the moveable fold mirror into the non-bypass mode;
operating the laser to direct the laser beam at the object;
receiving at least a portion of the laser beam that was reflected from the object at a detector in the laser; and
measuring a time required for the laser beam to travel a roundtrip from the laser to the object and back to the laser, wherein the measured time is indicative of a distance from the reflective telescope to the object.

12. The method of claim 11, further comprising the steps of:
changing a wavelength of the laser beam that is emitted from the laser; and
operating the laser to direct the laser beam with the changed wavelength at the object to highlight the object so that an asset is able to recognize the highlighted object.

13. The method of claim 12, wherein said asset is laser guided weaponry.

14. A method for using a reflective telescope, said method comprising the steps of:
providing said reflective telescope which comprises:
a first entrance pupil;
a second entrance pupil;
a primary mirror positioned to directly receive and reflect a first optical beam and a second optical beam that respectively passed through said first entrance pupil and said second entrance pupil;
a secondary mirror positioned to directly receive and reflect the first and second optical beams reflected from said primary mirror;
a beamsplitter positioned to directly receive and pass the first and second optical beams reflected from said secondary mirror;
a tertiary mirror positioned to directly receive and reflect the first and second optical beams that passed through said beamsplitter;
an exit pupil;
a quaternary mirror positioned to directly receive the first and second optical beams reflected from said tertiary mirror and said quaternary mirror positioned to reflect the first and second optical beams to said exit pupil;
a laser positioned to emit a laser beam which is received by at least one optical component and is then received by and reflected from said beamsplitter towards said second mirror positioned to directly receive and reflect the laser beam towards said primary mirror positioned to directly receive, reflect and collimate the laser beam; and
a moveable fold mirror that is capable of being moved from a non-bypass mode where said laser is used into a bypass mode where said laser is not used and where said moveable fold mirror when in the bypass mode is positioned to directly receive a third optical beam and a fourth optical beam and said moveable fold mirror positioned to reflect the third optical beam and the fourth optical beam directly to said exit pupil instead of the third optical beam and the fourth optical beam being reflected by said primary mirror, said secondary mirror, said tertiary mirror and said quaternary mirror to said exit pupilanalyzing at least one of the first optical beam, the second optical beam, the third optical beam or the fourth optical beam to find an object;

moving, if needed, the moveable fold mirror into the non-bypass mode;

operating the laser to direct the laser beam at the object to highlight the object so an asset is able to recognize the highlighted object.

15. The method of claim 14, wherein said asset is laser guided weaponry.

16. A reflective telescope comprising:
a first entrance pupil;
a second entrance pupil;
a primary mirror positioned to directly receive and reflect a first optical beam and a second optical beam that respectively passed through said first entrance pupil and said second entrance pupil;
a secondary mirror positioned to directly receive and reflect the first and second optical beams reflected from said primary mirror;
a beamsplitter positioned to directly receive and pass the first and second optical beams reflected from said secondary mirror;
a tertiary mirror positioned to directly receive and reflect the first and second optical beams that passed through said beamsplitter;
an exit pupil;
a quaternary mirror positioned to directly receive the first and second optical beams reflected from said tertiary mirror and said quaternary mirror positioned to reflect the first and second optical beams to said exit pupil; and
a laser positioned to emit a laser beam which is received by at least one optical component and is then received by and reflected from said beamsplitter towards said second mirror positioned to directly receive and reflect the laser beam towards said primary mirror positioned to directly receive, reflect and collimate the laser beam.

17. The reflective telescope of claim 16, further comprising a multiple field of view imager for analyzing either the first optical beam or the second optical beam at said exit pupil.

18. The reflective telescope of claim 16, wherein said at least one optical component comprises a reflective convex mirror.

19. The reflective telescope of claim 16, wherein said at least one optical component comprises a refractive recollimating optic unit including a titled wedge plate and a recollimating refractive achromatic doublet.

20. The reflective telescope of claim 16, wherein said at least one optical component comprises a gas cell and recollimating optics.

21. The reflective telescope of claim 1, wherein:
when the moveable fold mirror is in the non-bypass mode an ultra narrow field of view or a medium field of view is accommodated; and
when the moveable fold mirror is in the bypass mode a narrow field of view or a wide field of view is accommodated.

22. The method of claim 11, wherein:
when the moveable fold mirror is in the non-bypass mode an ultra narrow field of view or a medium field of view is accommodated; and
when the moveable fold mirror is in the bypass mode a narrow field of view or a wide field of view is accommodated.

23. The method of claim 14, wherein:
when the moveable fold mirror is in the non-bypass mode an ultra narrow field of view or a medium field of view is accommodated; and
when the moveable fold mirror is in the bypass mode a narrow field of view or a wide field of view is accommodated.

* * * * *